(12) United States Patent
So et al.

(10) Patent No.: US 7,656,132 B2
(45) Date of Patent: Feb. 2, 2010

(54) BATTERY CHARGER APPARATUS WITH A DIGITAL CHARGE REDUCTION LOOP

(75) Inventors: John Sung Ko So, Fremont, CA (US); David Alan Brown, San Jose, CA (US)

(73) Assignee: Advanced Analogic Technologies, Inc., Santa Clara, CA (US)

(*) Notice: Subject to any disclaimer, the term of this patent is extended or adjusted under 35 U.S.C. 154(b) by 380 days.

(21) Appl. No.: 11/559,790

(22) Filed: Nov. 14, 2006

(65) Prior Publication Data

US 2008/0111521 A1 May 15, 2008

(51) Int. Cl.
 *H02J 7/06* (2006.01)
 *H02J 7/24* (2006.01)
(52) U.S. Cl. ........................... 320/164; 320/134
(58) Field of Classification Search .............. 320/143, 320/164
 See application file for complete search history.

(56) References Cited

U.S. PATENT DOCUMENTS

| | | | |
|---|---|---|---|
| 3,912,108 A * | 10/1975 | Clayton et al. | 320/159 |
| 4,097,792 A * | 6/1978 | Calaway | 320/156 |
| 5,508,598 A | 4/1996 | Al-Abassy | |
| 5,625,275 A * | 4/1997 | Tanikawa et al. | 320/160 |
| 5,723,970 A | 3/1998 | Bell | |
| 6,144,187 A * | 11/2000 | Bryson | 320/137 |
| 6,194,875 B1 * | 2/2001 | Takimoto et al. | 320/164 |
| 6,507,172 B2 | 1/2003 | Sherman | |
| 2002/0038394 A1 | 3/2002 | Liang et al. | |
| 2004/0246341 A1 | 12/2004 | Lee et al. | |
| 2006/0033474 A1 | 2/2006 | Shum | |
| 2006/0214630 A1 | 9/2006 | Huang | |

OTHER PUBLICATIONS

PCT International Search Report for PCT/US07/81552, dated Mar. 13, 2008 (4 pages).

* cited by examiner

*Primary Examiner*—Edward Tso
*Assistant Examiner*—Samuel Berhanu
(74) *Attorney, Agent, or Firm*—Sheppard, Mullin, Richter & Hampton LLP

(57) ABSTRACT

A battery charger apparatus for charging a battery, comprises a charge-current control circuit for receiving a charge-current control signal to control an amount of charge current being drawn from an input source, e.g., a USB port or a line adapter; an analog control circuit for generating an analog control signal representative of a maximum amount of charge current to be used to charge a battery; a digital charge reduction loop including a circuit for determining a charge-current adjustment signal based on a source voltage of the input source; a counter for generating a digital count value based on the charge-current adjustment signal; and a digital-to-analog converter (DAC) for generating a DAC control signal based on the digital count value of the counter, the DAC control signal being representative of a reduced amount of charge current to be used to charge the battery; and a switching mechanism for selecting one of the analog control signal or the DAC control signal based on the source voltage, the selected control signal being used as the charge-current control signal to the charge-current control circuit.

32 Claims, 8 Drawing Sheets

BATTERY CHARGER APPARATUS WITH A DIGITAL CHARGE REDUCTION LOOP

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to battery chargers, and more particularly provides a battery charger apparatus with a digital charge reduction loop.

BACKGROUND

In recent years, the universal serial bus (USB) has become one of the most widely used techniques for interconnecting electronic devices. Originally used to interconnect computers and standard peripheral devices (e.g., printers, disk drives, etc.), USB has grown to support a vast array of portable USB devices (e.g., cellular telephones, personal digital assistants, cameras, personal music players, etc.).

USB devices are connected to a USB host (e.g., a PC, laptop, tablet PC, etc.) via USB ports. Generally, one USB host can support up to seven USB devices. In cases where more than seven USB devices are required, a USB hub may be used. Each USB hub may be connected to its own set of seven USB devices (or hubs as necessary). The USB connections between the USB host, USB hubs and USB devices allow data, e.g., names, phone numbers, calendars, photographs, music, etc., to flow between the USB host and USB devices.

Generally, a USB connection has a DC power line commonly referred to as the $V_{BUS}$, a ground, and a twisted pair of data lines commonly referred to as D+ and D−. According to the USB 2.0 standard, a valid USB host should supply 5 volts and no more than 500 milliamps of current. Further, USB ports are supposed to provide current-limit protection, which can be set as high as 5.0 amps and as low as 100 milliamps. However, not all USB ports adhere to the USB standard. Further, USB hosts have different types of ports, including AC-powered ports (e.g., in host PCs and powered hubs), non-powered ports (e.g., in notebook computers operating on battery power), passive ports (e.g., in passive hubs), etc. Each port type has a different power delivery capability. For example, an AC-powered port may source 5 volts and 500 milliamps of current or more. A non-powered (battery-powered) port may source 5 volts, but may share 500 milliamps of current with other USB ports on the USB host. Thus, a non-powered port often sources less than 500 milliamps of current. A passive port may source 5 volts and only 100 milliamps of current.

Typical USB devices have a rechargeable lithium-ion/polymer battery for sourcing operating power and a control system to re-charge the battery. According to the USB standard, a USB device may take power from the power line of the USB port both to operate its system core and to re-charge its battery. A USB device with a battery charger typically includes an apparatus for regulating charge current to prevent the charging process from drawing excessive current and starving the remainder of the USB device. Charge-current regulation is typically accomplished using two current sense resistors to monitor the charge current to the battery and the load current to the system core. While effective, this mechanism has drawbacks. Among these is the fact that the battery charger can select only from one of two charging currents, namely, 500 milliamps or 100 milliamps. At 100 milliamps, battery charging could take as long as 8-10 hours for an 800-milliamp battery. Users may become irritated and return USB devices and/or USB chargers as defective. Also, when a USB host or hub is capable of supplying more than 100 milliamps but less than 500 milliamps, traditional charge-current regulation operates as though extra capability did not exist. Thus, traditional charge-current regulation unnecessarily slows the charging process.

A system and method are needed to facilitate more effective use of USB potential for charging a battery of a battery-powered USB device.

Similar problems exist for typical AC adaptor power supplies. An electronic device that uses a rechargeable battery is typically supplied with an AC power adaptor rated to support the charge-current demands of the electronic device. However, some electronic devices are not supplied with a power adaptor and, in many cases, third party power adapters are used. Using a non-approved power adapter on an electronic device risks starving the system core of the device due the drawing of excessive charge-current. Thus, when working with battery chargers, USB port and AC power adapter capabilities must assure that the battery charging process does not starve system operation.

SUMMARY

In accordance with one embodiment, the present invention provides a battery charger apparatus for charging a battery, comprising a charge-current control circuit for receiving a charge-current control signal to control an amount of charge current being drawn from an input source, e.g., a USB port or a line adapter; and analog control circuit for generating an analog control signal representative of a maximum amount of charge current to be used to charge a battery; a digital charge reduction loop including a circuit for determining a charge-current adjustment signal based on a source voltage of the input source, a counter for generating a digital count value based on the charge-current adjustment signal, and a digital-to-analog converter (DAC) for generating a DAC control signal based on the digital count value of the counter, the DAC control signal being representative of a reduced amount of charge current to be used to charge the battery; and a switching mechanism for selecting one of the analog control signal or the DAC control signal based on the source voltage, the selected control signal being used as the charge-current control signal to the charge-current control circuit.

The charge-current control circuit may limit the charge current to the maximum charge current that the battery can handle. The circuit for determining a charge-current adjustment signal may include a first comparator for comparing a first voltage based on the source voltage against a reference voltage to generate a first comparator output signal, the first comparator output signal being for controlling the counter; and a second comparator for comparing a second voltage based on the source voltage against the reference voltage to generate a second comparator output signal, the second comparator output signal being for controlling the switching mechanism. The counter may count up when the first comparator output signal is a logical high value. The counter may count down when the first comparator output signal is a logical low value. The switching mechanism may select the DAC control signal as the charge-current control signal and the counter may reset to a predetermined digital value, when the second comparator output signal is a logical low value. The switching mechanism may select the analog control signal when the digital count value of the counter is at a predetermined digital value. The digital charge reduction loop may further comprise a clock oscillator for generating a clock signal, and the counter may modify the digital count value in coordination with the clock signal. The circuit for determining a charge-current adjustment signal may include a comparator for comparing a first voltage based on the source voltage against a reference voltage to generate a comparator control signal, the comparator control signal being for controlling the counter and the switching mechanism. The counter may count up when the comparator control signal is a logical high value. The counter may count down when the comparator control signal is a logical low value. The switching mechanism may select the DAC control signal as the charge-current control signal and the counter may reset, when the comparator control signal is a logical low value and the digital counter value is at a predetermined digital value. The switching mechanism may select the analog control signal as the charge-current control signal when the digital counter value is at a predetermined digital value. The switching mechanism may include an RS flip-flop for receiving a reset signal when the source voltage is below a trip threshold voltage, and for receiving a set signal when the digital count value is at a predetermined digital value, the RS flip-flop generating a RS output signal; and a multiplexer for selecting one of the analog control signal or the DAC control signal based on the RS output signal.

In accordance with one embodiment, the present invention provides a battery charger apparatus for charging a battery, comprising a charge-current control circuit for receiving a charge-current control signal to control an amount of charge current being drawn from an input source, e.g., a USB port or a line adapter; an analog control circuit for generating an analog control signal representative of a maximum amount of charge current to be used to charge a battery; a digital charge reduction loop including a circuit for determining a charge-current adjustment signal based on a source voltage of the input source, a counter for generating a digital count value based on the charge-current adjustment signal, and a digital-to-analog converter (DAC) for generating a DAC control signal based on the digital count value of the counter, the DAC control signal being representative of a reduced amount of charge current to be used to charge the battery; and a switching mechanism for selecting one of the analog control signal or the DAC control signal based on the source voltage, the selected control signal being used as the charge-current control signal to the charge-current control circuit.

The method may further comprise limiting the charge current to the maximum charge current that the battery can handle. The determining a charge-current adjustment signal may include comparing a first voltage based on the source voltage against a reference voltage to generate a first comparator output signal, the first comparator output signal being for controlling the generating the digital count value; and comparing a second voltage based on the source voltage against the reference voltage to generate a second comparator output signal, the second comparator output signal being for controlling the selecting. The generating the digital count value may include increasing the digital count value when the first comparator output signal is a logical high value. The generating the digital count value may include decreasing the digital count value when the first comparator output signal is a logical low value. When the second comparator output signal is a logical low value, the selecting may include selecting the DAC control signal as the charge-current control signal and the method may further comprise resetting the digital count value to a predetermined digital value. The selecting may include selecting the analog control signal when the digital count value is at a predetermined digital value. The method may further comprise generating a clock signal, and the selecting may include modifying the digital count value in coordination with the clock signal. The determining the charge-current adjustment signal may include comparing a first voltage based on the source voltage against a reference voltage to generate a comparator control signal, the comparator control signal being for controlling the generating the digital count value and the selecting. The generating the digital count value may include counting up when the comparator control signal is a logical high value. The generating the digital count value may include counting down when the comparator control signal is a logical low value. When the comparator control signal is a logical low value and the digital counter value is at a predetermined digital value, the selecting may include selecting the DAC control signal as the charge-current control signal and the method may further comprise resetting the digital count value. The selecting may include selecting the analog control signal as the charge-current control signal when the digital counter value is at a predetermined digital value. The method may further comprise receiving a reset signal when the source voltage is below a trip threshold voltage; receiving a set signal when the digital count value is at a predetermined digital value; and generating a RS output signal based on the received signal; wherein the selecting includes selecting one of the analog control signal or the DAC control signal based on the RS output signal.

In accordance with another embodiment, the present invention provides a digital charge reduction loop in a battery charger comprising a circuit for determining a charge-current adjustment signal based on a source voltage of an input source; a counter for generating a digital count value based on the charge-current adjustment signal; and a digital-to-analog converter (DAC) for generating a DAC control signal based on the digital count value of the counter, the DAC control signal being representative of an amount of charge current to be used to charge a battery.

In accordance with another embodiment, the present invention provides a digital charge reduction loop in a battery charger comprising means for determining a charge-current adjustment signal based on a source voltage of an input source; means for generating a digital count value based on the charge-current adjustment signal; and means for generating an analog control signal based on the digital count value, the control signal being representative of an amount of charge current to be used to charge a battery.

DETAILED DESCRIPTION

The following description is provided to enable any person skilled in the art to make and use the invention, and is provided in the context of a particular application and its requirements. Various modifications to the embodiments are possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

U.S. application publication No. 2006/0033474, entitled "USB Battery Charger," Ser. No. 11/916,339, filed on Aug. 11, 2004 by inventor K. Shum is hereby incorporated by reference.

Figure 1:
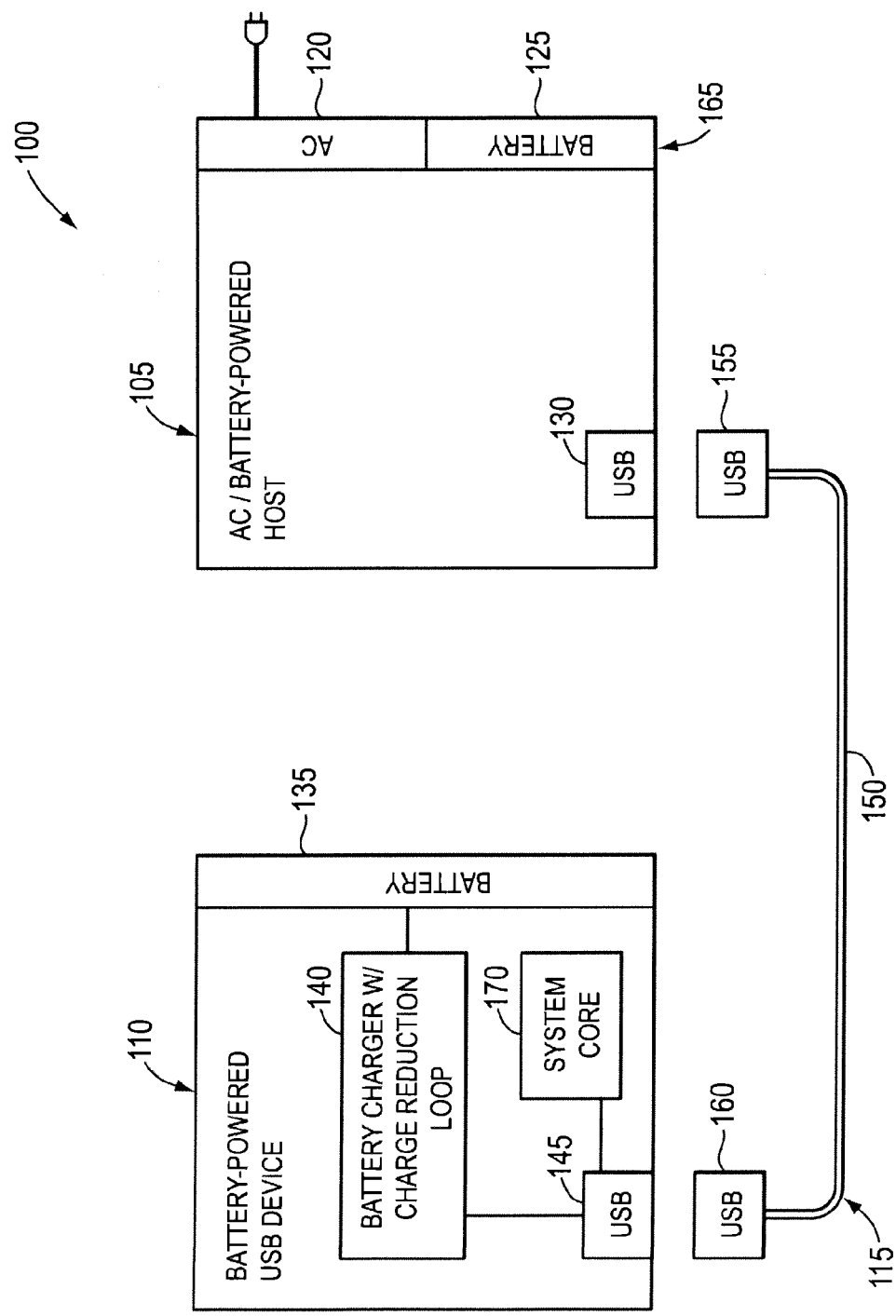
FIG. 1 is a circuit diagram of a battery charging system with a USB host and USB device, in accordance with an embodiment of the present invention.

FIG. 1 is a circuit diagram of a battery charging system 100 with a USB host 105 and battery-powered USB device 120, in accordance with an embodiment of the present invention. The USB host 105 may be coupled to the USB device 110 directly or via a USB cable 115. When the USB host 105 and the USB device 110 are interconnected, the USB host 105 and USB device 110 may exchange data, and/or the USB host 105 may charge the battery of the USB device 110.

The USB host 105 may include a desktop computer, a laptop computer, a tablet PC, etc. The USB host 105 includes a power source 165. When the USB host 105 is a desktop computer, the power source 165 may include an AC power supply 120 (and corresponding circuit). When the USB host 105 is a laptop, tablet PC or other portable computer system, the power source 165 may include both an AC power supply 120 and a battery 125 (and corresponding circuit), such that the AC power supply 120 powers the USB host 105 when connected to an AC outlet (not shown) and the battery 125 powers the USB host 105 when not connected to an AC outlet. The USB host 105 also includes one or more USB ports 130 (only one shown), each capable of connection to a USB device 110 directly or via the USB cable 150. The power source 165 powers the USB ports 130.

The USB device 110 may include a cellular telephone, a personal digital assistant (PDA), a personal music player, a camera, etc. The USB device 110 includes a rechargeable battery 135 (e.g., a lithium ion battery) and a battery charger 140 (with a digital charge reduction loop) coupled to the battery 135. The USB device 110 includes a USB port 145 coupled to the battery charger 140 and to the system core 170 of the USB device 110. The system core 170 includes the microprocessor(s), circuitry, memory, storage and/or the like, for operating the core functions of the USB device 110, e.g., the cellular telephone, the PDA, the personal music player, the camera, etc.

Figure 2:
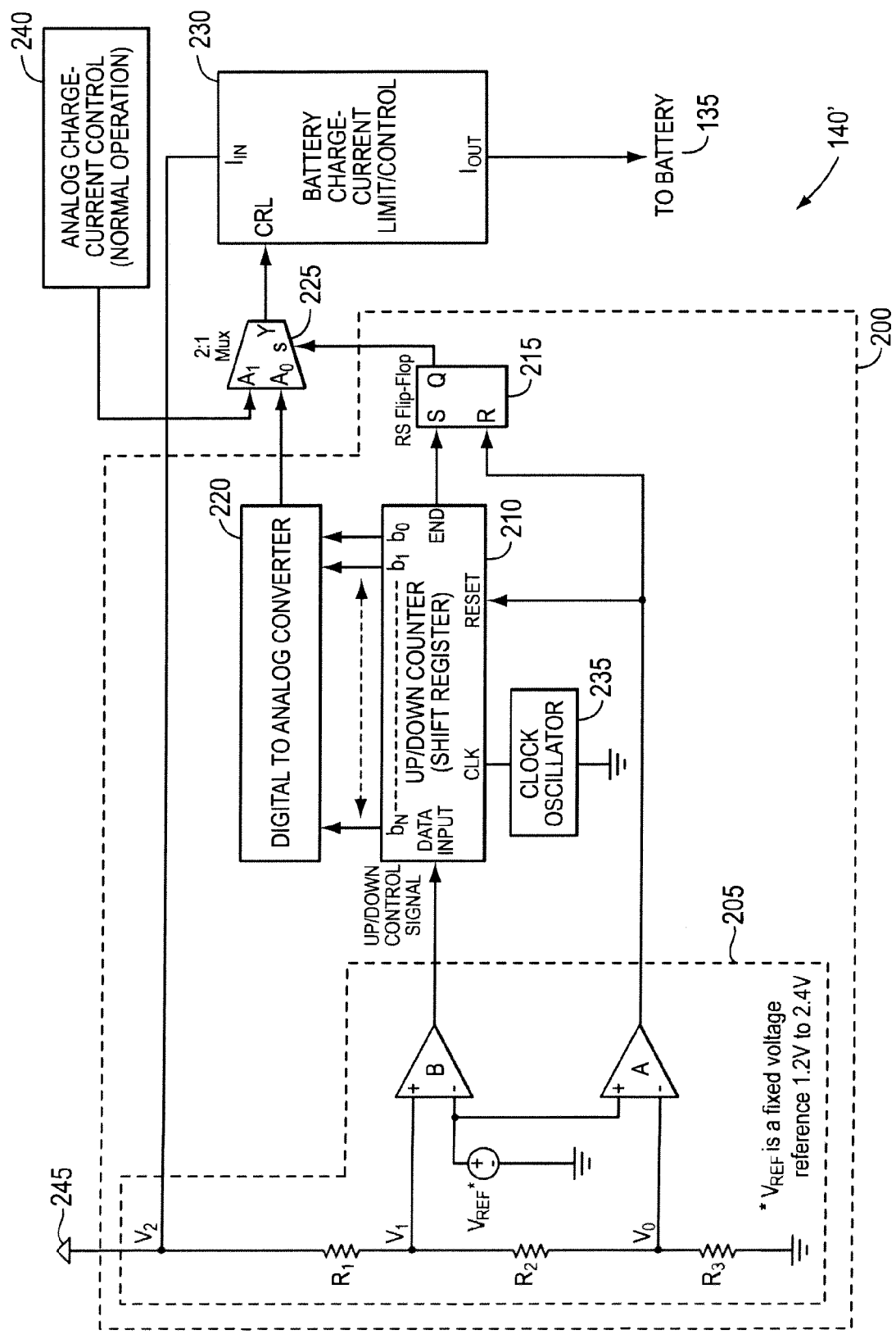
FIG. 2 is a circuit diagram illustrating details of a battery charger with a digital charge reduction loop, in accordance with an embodiment of the present invention.
Figure 5:
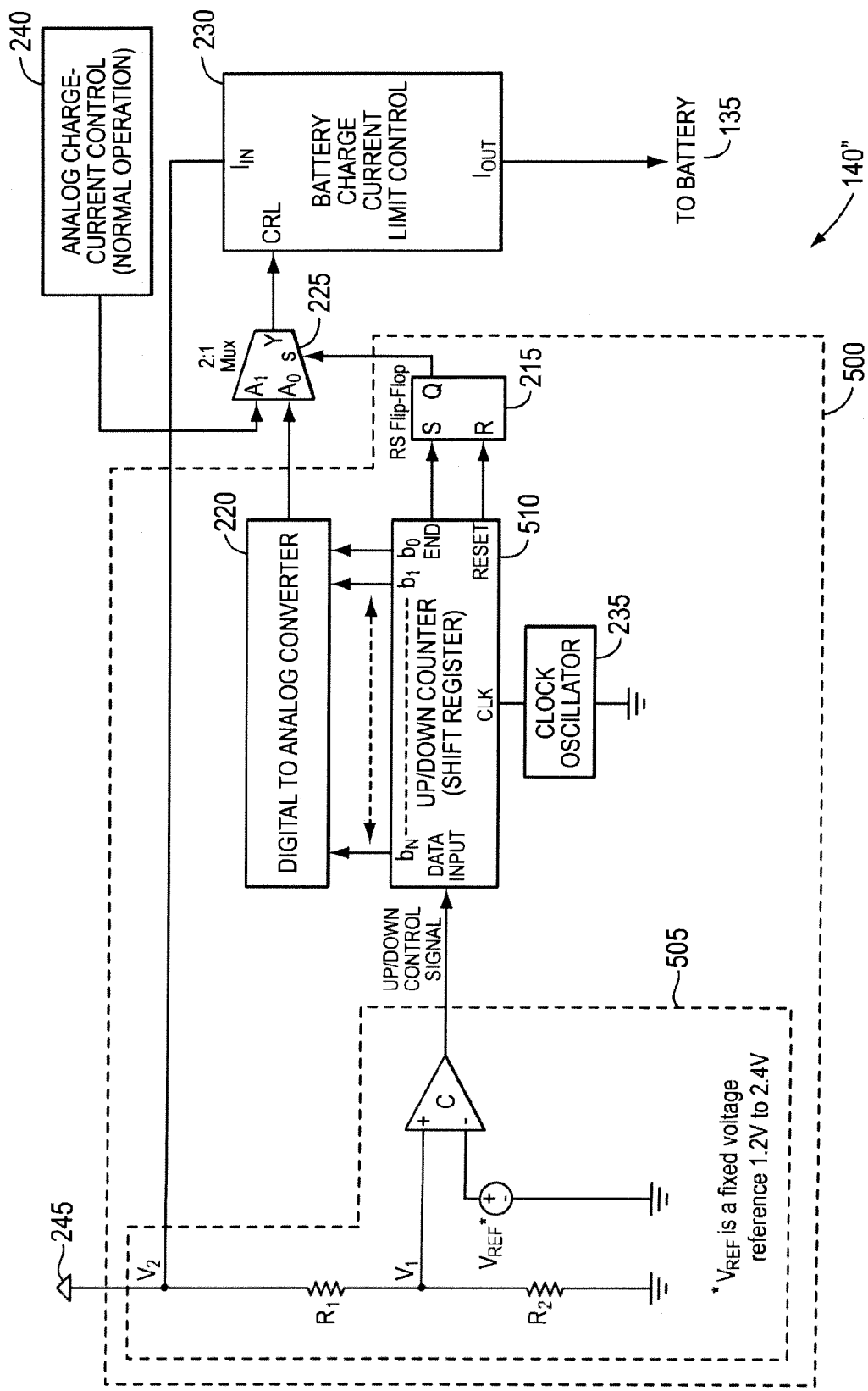
FIG. 5 is a circuit diagram illustrating details of a battery charger with a digital charge reduction loop, in accordance with another embodiment of the present invention.
Figure 6A:
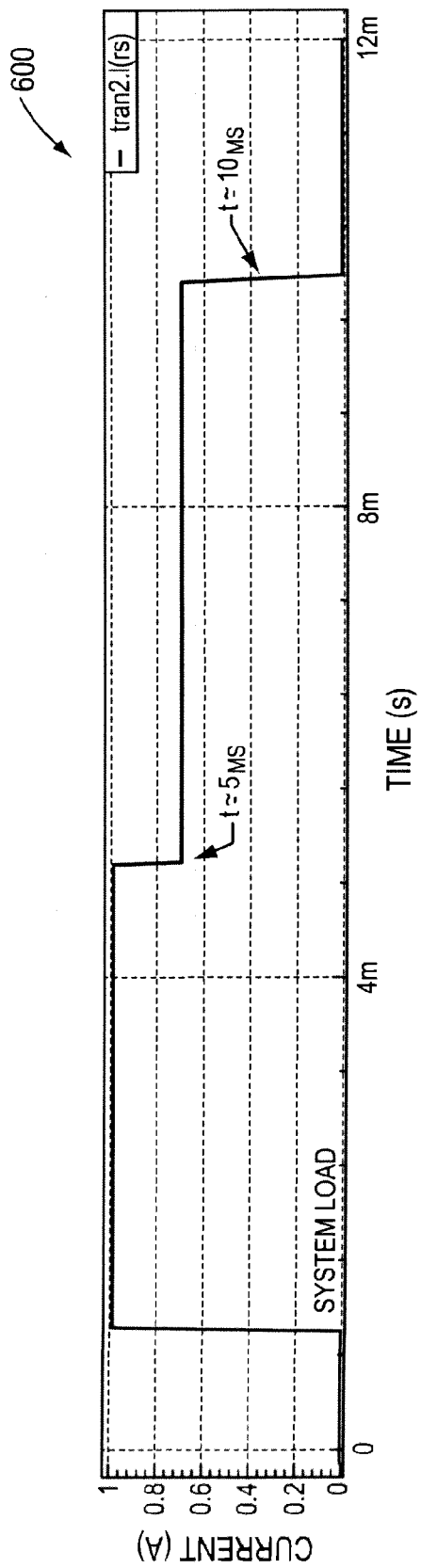
FIG. 6 illustrates a voltage/time and current/time diagrams of a digital charge reduction loop managing charge current from a line adapter capable of sourcing greater amounts of current than a typical USB port.
Figure 6B:
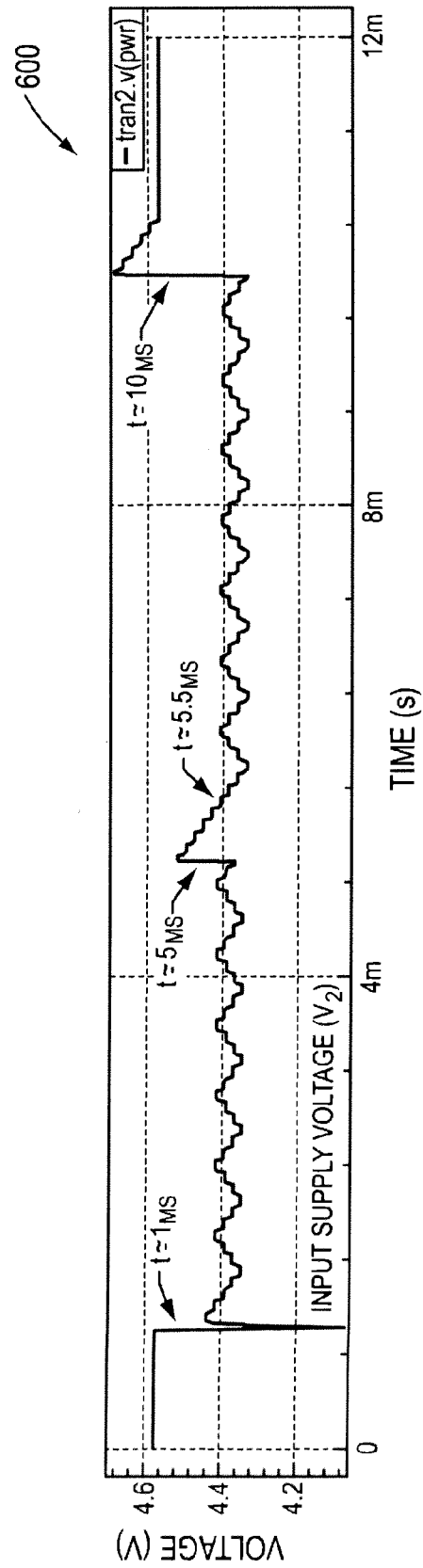
Figure 6C:
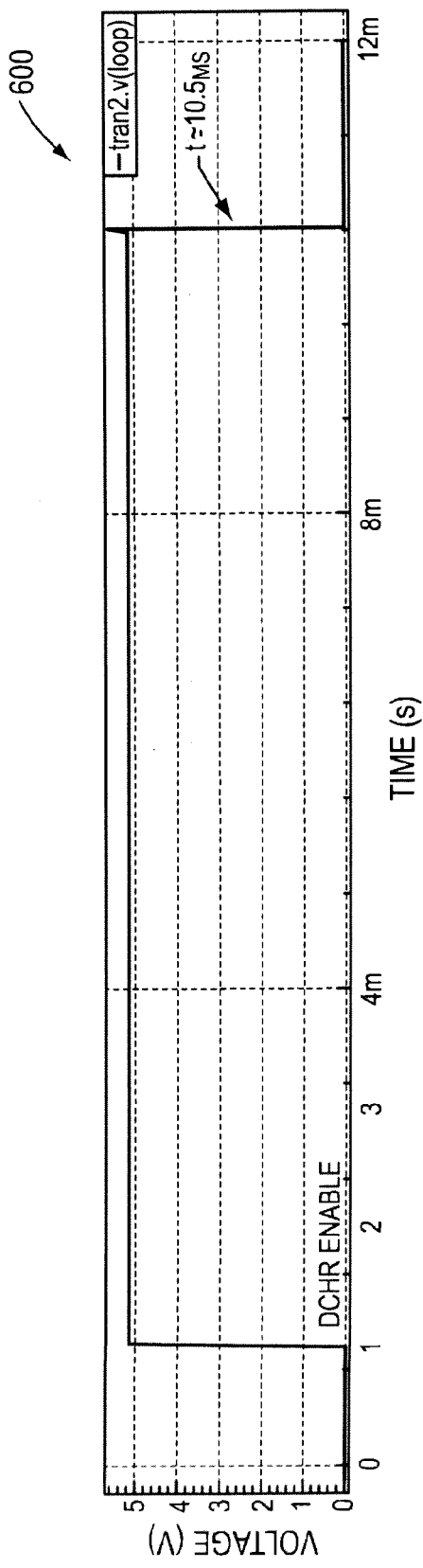
Figure 6D:
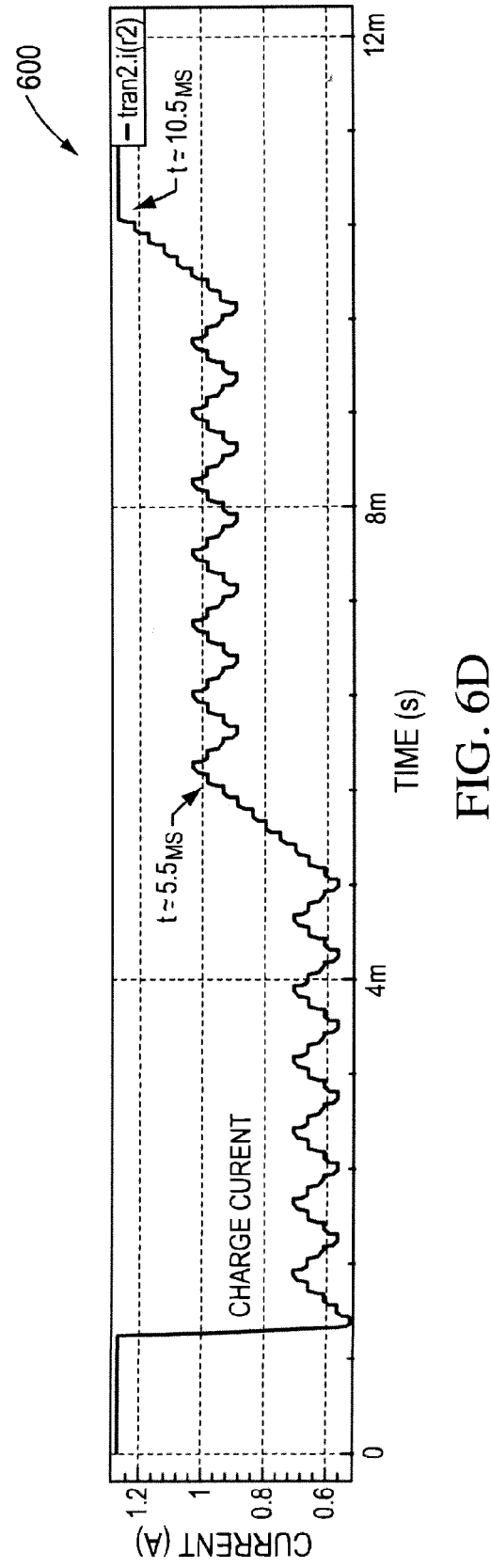

When the USB device 110 is not connected to the USB host 105, the system core 170 of the USB device 110 is powered by its internal battery 135. However, when the USB device 110 is connected to the USB host 105, the system core 170 may be powered fully or partially by the power supplied over the power line of the USB port 145 from the USB host 105. Further, the battery charger 140 may draw power from the power line of the USB port 145 to charge the battery 135. In one embodiment, the battery charger 140 is operative to take only as much current from the USB port 145 as possible without starving the system core 170. If the system core 170 is inactive, then the battery charger 140 takes the maximum possible charge current, for example, 500 milliamps, that the USB port 145 can source and/or that the battery charger 140 can accept without damage. If the system core 170 is active and drawing a load current, then the battery charger 140 uses the remainder of the current available and/or that the battery charger 140 can accept. For example, if the system core 170 needs 200 milliamps of load current, then the battery charger 140 takes the remaining 300 milliamps of a USB port 130 that is capable of providing a maximum of 500 milliamps of current. A first example battery charger 140' with a digital charge reduction loop is shown in FIG. 2. A second example battery charger 140" with a digital charge reduction loop is shown in FIG. 5.

Generally, the battery charger 140 takes advantage of the fact that, when a circuit pulls more current than is available from an input source, the source voltage drops. Per the USB 2.0 standard, a USB port may sag as low as 4.4 volts, and thus USB devices 110 must be capable of operating with as little as 4.4 volts of input voltage. Per one embodiment, the battery charger 140 initially draws a maximum charge current. If the voltage of the USB port 130 drops below a trip voltage threshold, e.g., 4.4 volts, then the battery charger 140 draws only a minimum charge current until the source voltage returns above a safe voltage threshold, e.g., 4.5 volts. Then, the battery charger 140 step-wise increases the charge current it draws from the USB port 145 (e.g., in steps of predetermined amperage), and monitors the source voltage of the USB port 145 until the source voltage drops below the safe voltage threshold. When the source voltage drops below the safe voltage threshold, the battery charger 140 step-wise decreases the charge current it draws until the source voltage rises above the safe voltage threshold (or the maximum charge current is reached). The battery charger 140 continues to monitor the source voltage, and repeats step-wise increasing and step-wise decreasing the charge current, thus causing the charger current to oscillate about the maximum charge current possible at a given time. If at any time the load current changes, the battery charger 140 follows the above protocol.

For example, assume that the USB port 130 is capable of sourcing a maximum 500 milliamps of current. If the system core 170 draws no load current, then the battery charger 140 draws all 500 milliamps as charge current to charge the battery 135. If the system core 170 draws 200 milliamps of load current, then the battery charger 140 notices a voltage drop at the USB port 145 below the trip voltage threshold. The battery charger 140 responsively drops to a minimum charge current until the source voltage returns above a safe voltage threshold. The battery charger 140 step-wise increases the charge current until the source voltage drops below the safe voltage threshold. Then, the battery charger 140 step-wise decreases the charge current and the source voltage rises above the safe voltage threshold. Accordingly, the source voltage stabilizes at (oscillates about) the safe voltage threshold, and the charge current stabilizes at (oscillates about) the maximum charge current possible. If the USB port 130 is capable of sourcing 500 milliamps and the load current is about 200 milliamps, then the charge current will stabilize at (oscillate about) 300 milliamps.

FIG. 2 is a circuit diagram illustrating details of a battery charger 140' with a digital charge reduction loop 200, in accordance with an embodiment of the present invention. The battery charger 140' is an example embodiment of the battery charger 140 of FIG. 1. The battery charger 140' includes a digital charge reduction loop 200 coupled to an input source 245 (e.g., the $V_{BUS}$ of the USB port 145), an analog charge-current control circuit 240, a multiplexer 225 coupled to the digital charge reduction loop 200 and to the analog charge-current control circuit 240, and a charge-current limit/control circuit 230 coupled to the input source 245 and to the multiplexer 225.

Generally, the analog charge-current control circuit 240 operates during normal mode, when maximum charge-current is available from the input source 245. The analog charge-current control circuit 240 may include a predetermined voltage signal, a modifiable voltage signal, or other analog control-signal generating circuit. The digital charge reduction loop 200 operates during reduced charge-current mode, when less than the maximum charge-current is available from the input source 245. The multiplexer 225 operates to select one of the analog charge-current control circuit 240 or the digital charge reduction loop 200 as the charge-current controlling circuit to control the charge-current limit/control circuit 230. The charge-current limit/control circuit 230 operates to draw the charge current from the input source 245 to the battery 135 based on the control signal it receives from the multiplexer 225, however, limited to a maximum charge current that the battery 135 can accept without risking damage, e.g., 1 A. The charge-current limit/control circuit 230 may include a gated-MOS, e.g., PMOS or NMOS, circuit.

The digital charge reduction loop 200 includes a source voltage analysis circuit 205 coupled to the input source 245, an up/down counter 210 (e.g., a shifter) coupled to the source voltage analysis circuit 205, a digital to analog converter (DAC) 220 coupled to the up/down counter 210 and to the multiplexer 225, an RS flip-flop 215 coupled to the source voltage analysis circuit 205, to the up/down counter 210 and to the multiplexer 225, and a clock oscillator 235 coupled to the up/down counter 210.

The source voltage analysis circuit 205 monitors the source voltage of the input source 245. If current demand on the input source 245 causes the source voltage to drop below a trip voltage threshold, then the multiplexer 225 selects the digital charge reduction loop 200 to control the charge current. Essentially, when the source voltage drops below the trip threshold voltage, the source voltage analysis circuit 205 resets the RS flip-flop 215, which causes the multiplexer 225 to select the digital charge reduction loop 200 to control the charge-current limit/control circuit 230.

Having been selected as the charge-current control circuit, the digital charge reduction loop 200 reduces the charge current to a predetermined minimum, thereby allowing the source voltage at the input source 245 to recover to a point above a safe voltage threshold (in this case measured at node V1, although measurable at any node). Once recovered, the digital charge reduction loop 200 steps up the charge current until the source voltage drops below the safe voltage threshold. At this time, the digital charge reduction loop 200 steps down the charge current, thereby allowing the source voltage to rise again. In a repeating fashion, the digital charge reduction loop 200 identifies a "steady-state" charge current where the input source 245 is not overloaded and the battery 135 is being charged using the maximum charge current available.

Should the capability of the input source 245 increase or should the load current demand reduce, the up/down counter 210 may eventually reach a maximum count ($b_n$). When the maximum count is reached, the up/down counter 210 sends an END signal to set the RS flip-flop 215, which causes the multiplexer 225 to return control of the charge current back to the analog control circuit 240.

In this embodiment, the source voltage analysis circuit 205 includes three resistors, $R_1$, $R_2$ and $R_3$, coupled in series between the input source 245 and ground, respectively. A first comparator A is coupled to the node V1 between the resistors R1 and R2 and to a reference voltage VREF, e.g., 2.0V (or other voltage). A second comparator B is coupled to the node V0 between the resistors R2 and R3 and to the reference voltage VREF. The three resistors, $R_1$, $R_2$ and $R_3$, and the reference voltage VREF set the voltage thresholds, namely, the trip voltage threshold and the safe voltage threshold. The trip voltage threshold (digital charge reduction loop 200 enable), measured at node $V_0$, is set for 1.98V, resets the up/down counter 210, and causes selection of the digital charge reduction loop 200 by the multiplexer 225. The safe voltage threshold (digital charge reduction loop 200 control), measured at node $V_1$, is set at 2.02V and controls the up/down count of the digital counter 210, which in turn controls the DAC 220, which in turn controls the charge-current limit/control circuit 230.

In a specific embodiment, when the input source 245 is greater than 4.5V, $V_0$ is greater than 1.98V. Thus, the analog control circuit 240 controls charge current to the battery 135. Should the input source 245 be unable to supply the charge current or should the load current and charge current exceed the current capacity of the input source 245, the source voltage at the input source 245 will drop below 4.5V. $V_0$ and $V_1$ will subsequently drop in a linear scale based upon the values of the resistors $R_1$, $R_2$ and $R_3$. When $V_0$ falls below the trip voltage threshold, e.g., 1.98V, comparator A will reset the RS flip-flop 215, causing the multiplexer 225 to transition control of the charge current from the analog control circuit 240 to the digital charge reduction loop 200. Further, comparator A will reset the up/down counter 210 to its lowest level, setting the DAC 220 to a predetermined minimum, which in turn reduces the charge current to a predetermined minimum. This restores the integrity of the input source 245 and prevents shutdown or potential damage to the input source 245 or the system core 170.

The comparator B compares the voltage at node V1 against the reference voltage VREF and responsively generates a control signal. If the voltage at node V1 is greater than the safe voltage threshold (as measured at V1), e.g., 2.02V, then the comparator B generates a logical-high control signal. Otherwise, comparator B generates a logical-low control signal. A clock period later, the up/down counter 210 samples the control signal from the comparator B. If the voltage seen by comparator B is logical-high (as expected with reduced load current), the logical-high control signal causes the up/down counter 210 to count up by one, thus setting the $b_0$ bit and increasing the output voltage of the DAC 220 by one predetermined step. Thus, the DAC 220 increases the charge current by one predetermined step. As charge current is stepped up, charge current increases the current demand placed on the input source 245, causing source voltage reduction. When the source voltage drops below the safe voltage threshold, the control signal transitions to a logical-low state, causing a down count in the up/down counter 210. The down count causes a step down reduction in the output voltage of the DAC 220, thus causing a step reduction in the charge current. After a number of clock cycles, the digital charge reduction loop 200 stabilizes (e.g., oscillates about) at the maximum charge current supported by the input source 245.

When a source fault terminates or load current is reduced, the digital charge reduction loop 200 steps up the charge current. When the up/down counter 210 reaches the maximum level, namely, the $b_n$ level, the up/down counter 210 sends an END signal to set the SR flip-flop 215, which controls the multiplexer 225 to shift control back to the analog control circuit 240.

It will be appreciated that the up/down counter 210 may shift at any resolution, e.g., 32 steps or 64 steps, depending on how course or fine to make the voltage/current steps. A courser resolution may provide a faster response. Also, greater resolution may require a longer shifter. It will also be appreciated that an embodiment may be implemented with only a digital charge reduction loop 200 and without an analog control circuit 240.

Figure 3:
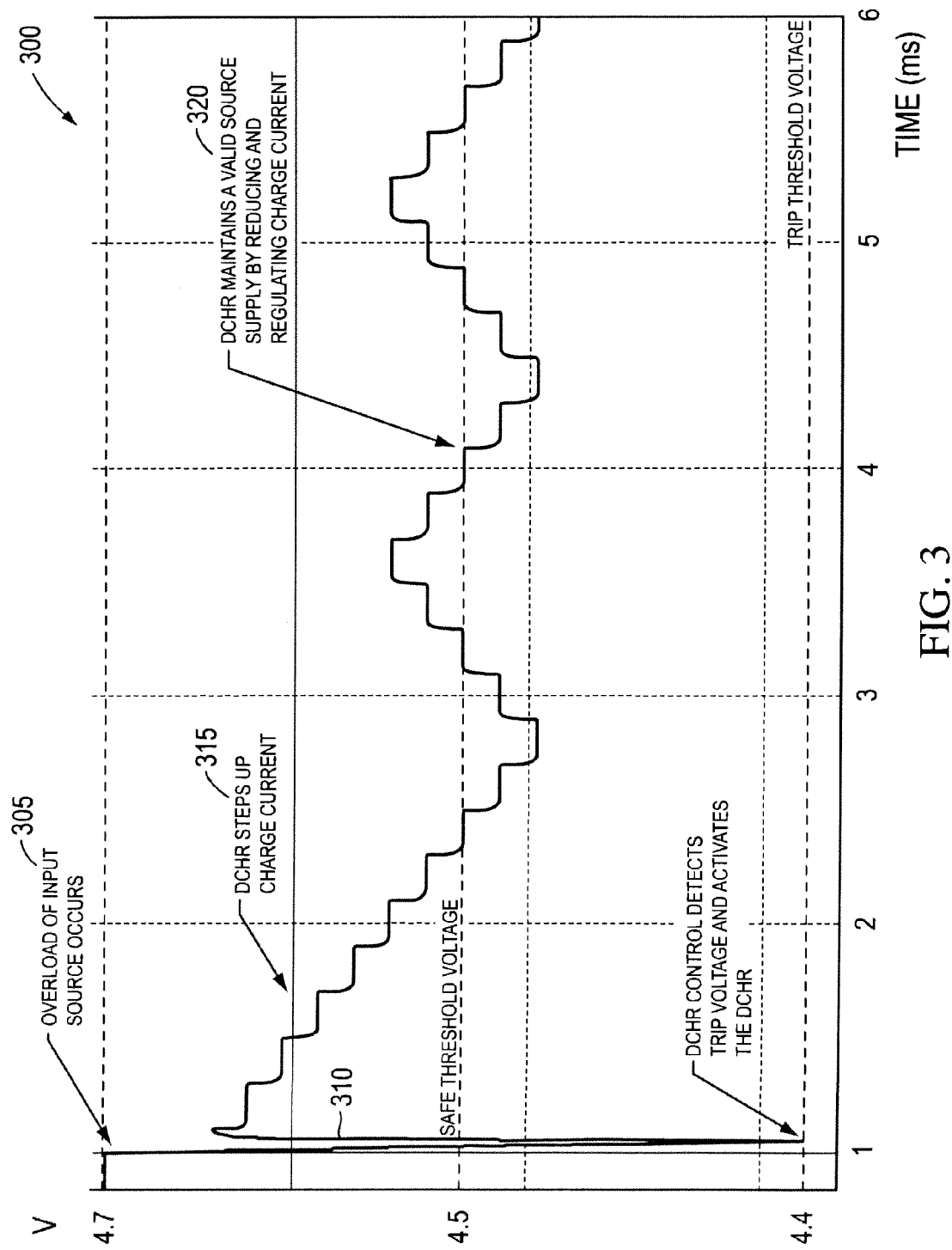
FIG. 3 illustrates a voltage/time diagram for the battery charger of FIG. 2 in operation, in accordance with an embodiment of the present invention.
Figure 4A:
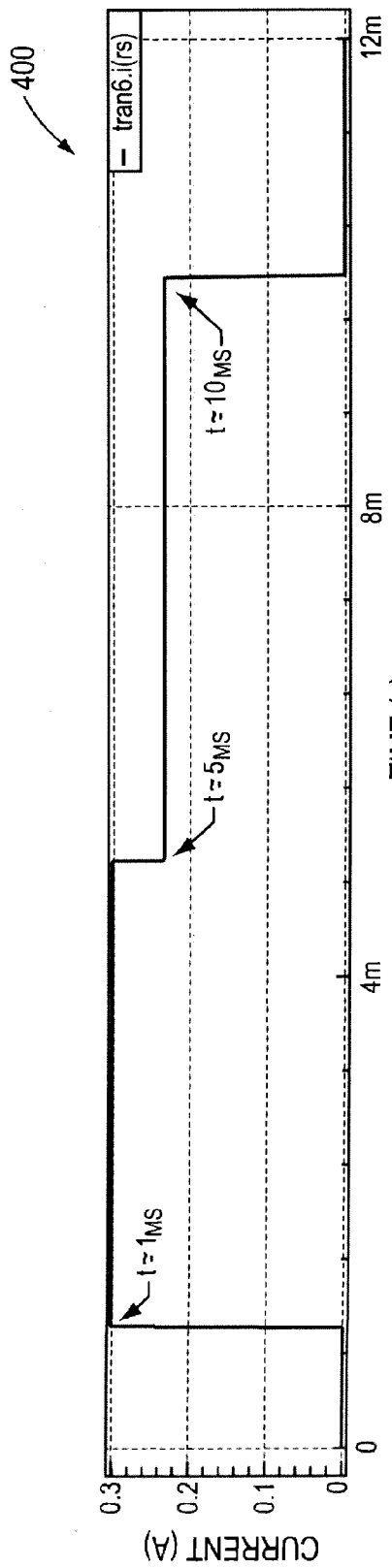
FIG. 4 illustrates voltage/time and current/time diagrams for the battery charger of FIG. 2 in operation, in accordance with an embodiment of the present invention.
Figure 4B:
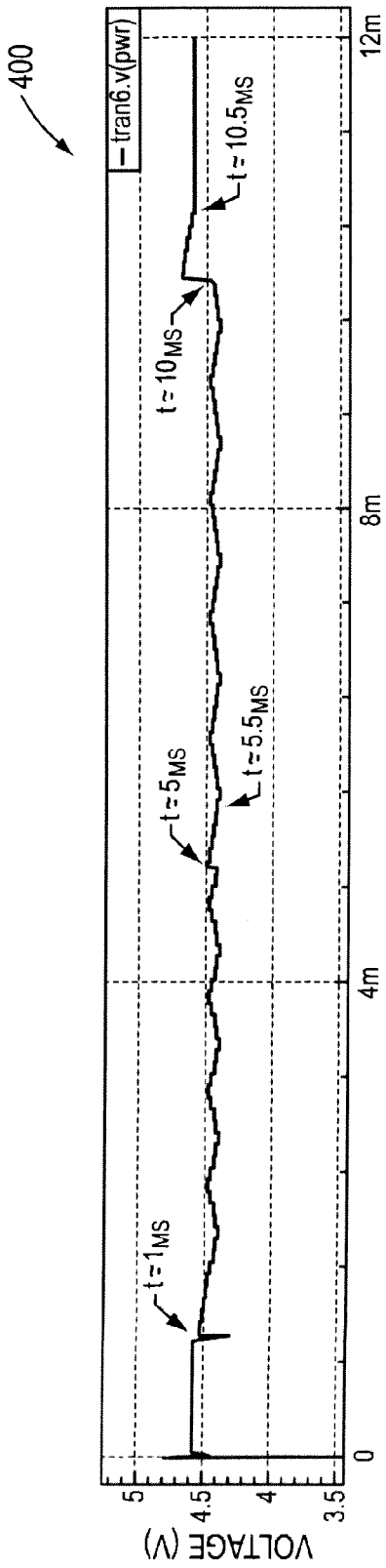
Figure 4C:
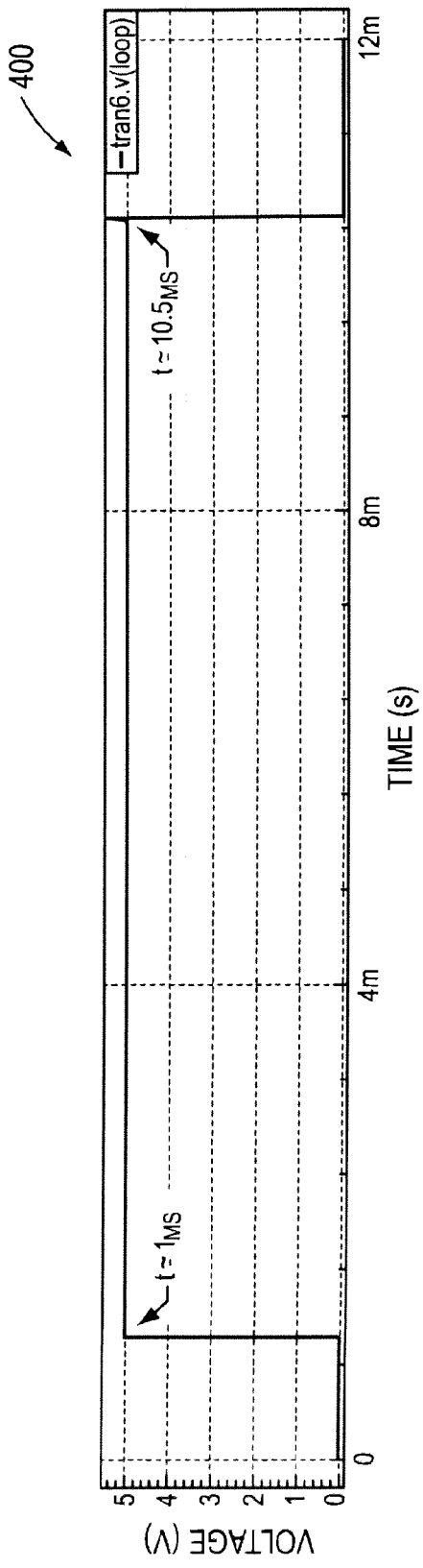
Figure 4D:
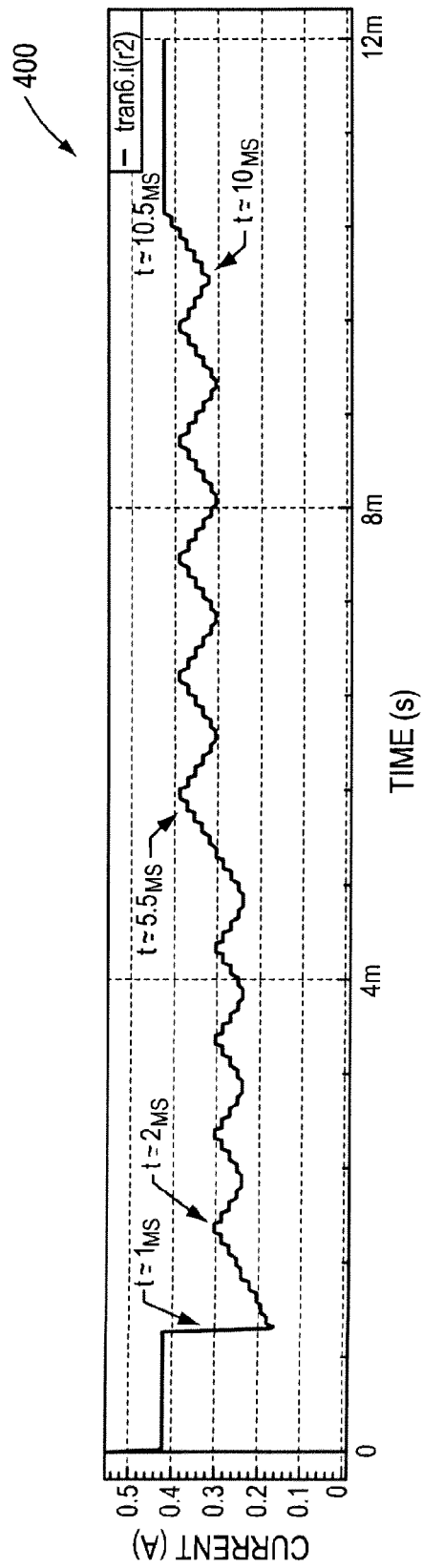

FIG. 3 illustrates a voltage/time diagram 300 for the battery charger 140' of FIG. 2, in accordance with an embodiment of the present invention. As shown in the figures, the term "Digital Charge Reduction Loop" can be conveniently written as "DCHR." The diagram 300 illustrates four (4) stages of the digital charge reduction loop 200. During stage 305, while the analog control circuit 240 controls the charge current, the digital charge reduction loop 200 measures the source voltage of the input source 245. As shown, overload of the input source 245 occurs during stage 305, thus causing the source voltage to drop. Stage 310 begins when the digital charge reduction loop 200 recognizes that the source voltage has dropped to a trip voltage threshold, thus causing transition of charge-current control from the analog control circuit 240 to the digital charge reduction loop 200. The digital charge reduction loop 200 reduces charge current to a predetermined minimum, thus allowing the source voltage to recover back to a point above the safe voltage threshold (in this case, back to about 4.6V). Stage 315 begins when the source voltage has recovered to the point above the safe voltage threshold, at which time the digital charge reduction loop 200 begins to step up the charge current upon every clock cycle. In response to the stepping up of the charge current, stage 315 illustrates the source voltage stepping down until it reaches the safe threshold voltage. Stage 320 begins when the source voltage reaches the safe threshold voltage, at which time the digital charge reduction loop 200 begins to step down the charge current, thus causing the source voltage to rise above the safe voltage threshold. Having risen above the safe voltage threshold, the digital charge reduction loop 200 steps up the charge current, thus causing the source voltage to drop below the safe voltage threshold. Accordingly, during stage 320, the digital charge reduction loop 200 causes a steady-state charge current as the source voltage stabilizes at (e.g., oscillates about) the safe voltage threshold.

FIG. 4 illustrates voltage/time and current/time diagrams 400 for the battery charger 140' of FIG. 2, in accordance with an embodiment of the present invention.

Diagram 400(a) illustrates load current over a time period of 12 milliseconds (ms). As shown, from t=0 ms to t=1 ms, the system core 170 of the USB device 110 draws no current. From about t=1 ms to about t=5 ms, the system core 170 draws about 300 mA of current. From about t=5 ms to about t=10 ms, the system core 170 draws about 230 mA of current. After about t=10 ms, the system core 170 draws no current.

Diagram 400(b) illustrates source voltage of the input source 245 over the same time period. As shown, from t=0 ms until about t=1 ms (while the system core 170 draws no load current), the source voltage is stable at about 4.6V. At about t=1 ms, when the system core 170 begins drawing a load current of 300 mA, the source voltage drops below the trip voltage threshold of about 4.4V. Immediately thereafter (as the digital charge reduction loop 200 takes over charge-current control), the source voltage returns to a safe voltage threshold of about 4.5V and stabilizes at about 4.45V. At about t=5 ms, when the system core 170 reduces its load current from about 300 mA to about 230 mA, the source voltage rises slightly. From about t=5 ms to about t=5.5 ms (as the digital charge reduction loop 200 steps up the charge current), the source voltage lowers again to the safe voltage threshold. From about t=5.5 ms to about t=10 ms, the source voltage remains stable at the safe voltage threshold. At about t=10 ms (after the system core 170 stops drawing any load current), the source voltage rises upward. At about t=10.5 ms (as the analog control circuit 240 takes over charge-current control), the source voltage flattens at about 4.6V.

Diagram 400(c) illustrates loop activation/deactivation over the same time period. As shown, the digital charge reduction loop 200 is deactivated at t=0 ms, activated at about t=1 ms (when the source voltage drops below the trip voltage threshold), and is deactivated at about t=10.5 ms (when the charge current rises above the maximum charge current controlled by the digital charge reduction loop 200).

Diagram 400(d) illustrates charge current over the same time period. As shown, from t=0 ms to about t=1 ms (when the system core 170 draw no load current and the analog control circuit 240 is in control), the charge current is stable at about 420 mA. At about t=1 ms (upon detection of the source voltage dropping below the trip voltage threshold, after the load current increases to 300 mA, and after the digital charge reduction loop 200 takes control of the charge current from the analog control circuit 240), the charge current drops from 420 mA to a predetermined minimum of about 170 mA. Then, slightly after about t=1 ms (after the source voltage has recovered), the digital charge reduction loop 200 steps up the charge current until the source voltage reaches the safe voltage threshold of about 4.5V at about t=2 ms. At about t=2 ms, the charge current stabilizes at (e.g., oscillates about) about 270 mA. Then, at about t=5 ms (as the digital charge reduction loop 200 recognizes a slight increase in the source voltage due to the decrease in load current from 300 mA to about 230 mA), the charge current begins to step up. At about t=5.5 ms (as the source voltage stabilizes at the safe voltage threshold), the charge current stabilizes at about 350 mA. At about t=10 ms (as the digital charge reduction loop 200 recognizes an increase in the source voltage due to the system core 170 drawing no load current), the digital charge reduction loop 200 steps up the charge current. At about t=10.5 ms (as the analog control circuit 240 takes over control of the charge current from the digital charge reduction loop 200), the charge current flattens again at about 420 mA.

FIG. 5 is a circuit diagram illustrating details of a battery charger 140" with a digital charge reduction loop 500, in accordance with another embodiment of the present invention. The battery charger 140" is a second example embodiment of the battery charger 140 of FIG. 2. Like battery charger 140', battery charger 140" includes a digital charge reduction loop 500 coupled to an input source 245 (e.g., the $V_{BUS}$ of the USB port 145), an analog charge-current control circuit 240, a multiplexer 225 coupled to the digital charge reduction loop 500 and to the analog charge-current control circuit 240, and a charge-current limit/control circuit 230 coupled to the input source 245 and to the multiplexer 225.

As shown, the digital charge reduction loop 500 can be implemented with a low range hysteresis using only one comparator, namely, comparator C. In this case, trip and safe voltage thresholds are separated by the hysteresis level. When the source voltage of the input source 245 is maximized (such that the up/down counter 510 is at its maximum count), the multiplexer 245 causes the analog control circuit 240 to control the charge current. When the source voltage falls below the trip voltage threshold (comparator C high to low threshold), the digital charge reduction loop 500 is activated. The output signal of the comparator C goes low when the RS Flip-Flop 215 is at the 'SET' stage (Q output logic high), causing the up/down counter 510 to reset, reducing the digital count value of the up/down counter 510 to a predetermined minimum. Resetting the up/down counter 510 also causes the up/down counter 510 to reset the RS flip-flop 215, which causes the multiplexer 225 to transition charge-current control from the analog control circuit 240 to the digital charge reduction loop 500.

The digital charge reduction loop 500 reduces charge current to a predetermined minimum, thereby causing the source voltage to recover above the safe/trip voltage threshold. Every clock cycle that the output signal of the comparator C is high, the up/down counter 510 steps up the its output count (b0-bn) to the DAC 220, which controls the charge-current limit/control circuit 230, which in turn controls the charge current. For every clock cycle that the output signal of the comparator C is low (while the up/down counter 510 is not on its maximum count), the up/down counter 510 counts down. The source voltage stabilizes at (e.g., oscillates about) the trip/safe voltage threshold, causing the charge current to stabilize at the maximum current available. When the up/down counter 510 reaches its maximum count, the up/down counter 510 sends and END signal to the RS flip-flop 215, which controls the multiplexer 225 to return control of the charge current back to the analog charge-current control circuit 240.

Embodiments of the digital charge reduction loop may provide several advantages over an analog/linear charge reduction loop. For example, trip and safe voltage thresholds may be more easily adjusted, and hysteresis may be added to increase charge reduction loop stability to line and load transient effects with the source supply. The digital charge reduction loop 200/500 may provide greater ease of adjusting digital charge reduction loop start-up and response time. The response of the clock oscillator 235, the up/down counter 210/510 speed, and the DAC 220 may be adjusted for the timing needs of a given application. The digital charge reduction loop may be less prone to adverse noise issues commonly associated with DC-DC switching charge-current regulation systems, making the digital charge reduction loop more desirable for implementation in integrated circuits for DC-DC switching battery chargers. Further, for battery charge integrated circuit (IC) applications, a digital charge reduction loop may save space and cost by virtue of the circuit being able to share elements (such as the system clock and counters) with other unrelated control circuits within the IC (such as temperature control). Sharing circuit elements allows for reduced IC die size, thus reducing space needs and manufacturing costs.

It will be appreciated that the digital charge reduction loop 200/500 is applicable to scenarios not involving battery charging using a USB port as an input source 245. For example, battery charging can be performed with high-current external power supplies, commonly referred to as "line adaptors". As stated above, designers may supply a line adaptor with specifications rated to meet or exceed the current requirements of the system and battery charging operations. However, when a non-approved input source 245 is used with a device 110 that has an insufficient current handling capacity, the digital charge reduction loop 200/500 may reduce charge current to a safe level, possibly better than the limits of a USB port.

FIG. 6 illustrates a voltage/time and current/time diagrams 600 of a digital charge reduction loop managing charge current from a line adapter that is capable of sourcing amounts of current greater than a typical USB port.

Diagram 600(a) illustrates load current over a time period of 12 ms. As shown, from t=0 ms to t=1 ms, the system core 170 of the USB device 110 draws no current. From about t=1 ms to about t=5 ms, the system core 170 draws about 1 A of current. From about t=5 ms to about t=10 ms, the system core 170 draws about 700 mA of current. After about t=10 ms, the system core 170 draws no current.

Diagram 600(b) illustrates source voltage of the input source 245 over the same time period. As shown, from t=0 ms until about t=1 ms (while the system core 170 draws no load current), the source voltage is stable at about 4.6V. At about t=1 ms (when the system core 170 begins drawing a load current of 1 A), the source voltage drops below the trip voltage threshold of about 4.3V. Immediately thereafter (as the digital charge reduction loop 200/500 takes over charge-current control), the source voltage quickly returns to a safe voltage threshold of about 4.4V and becomes stable at about 4.4V. At about t=5 ms (when the system core 170 reduces its load current from about 1 A to about 700 mA), the source voltage rises slightly to about 4.5V. From about t=5 ms to about t=5.5 ms (as the digital charge reduction loop 200/500 steps up the charge current), the source voltage lowers again to the safe voltage threshold. From about t=5.5 ms to about t=10 ms, the source voltage remains stable at the safe voltage threshold. At about t=10 ms (after the system core 170 stops drawing any load current), the source voltage quickly rises upward. At about t=10.5 ms (as the analog control circuit 240 takes over charge-current control from the digital charge reduction loop 200/500), the source voltage flattens at about 4.5V.

Diagram 600(c) illustrates loop activation/deactivation over the same time period. As shown, the digital charge reduction loop 200/500 is deactivated at t=0 ms, activated at about t=1 ms, and deactivated at about t=10.5 ms.

Diagram 600(d) illustrates charge current over the same time period. As shown, from t=0 ms to about t=1 ms (when the system core 170 draws no load current and the analog control circuit 240 is in control), the charge current is stable at about 1.25A. At about t=1 ms (upon detection of the source voltage dropping below the trip voltage threshold, after the load current increases to 1 A, and after the digital charge reduction loop 200/500 takes charge-current control from the analog control circuit 240), the charge current drops from 1.25A to a predetermined minimum of about 500 mA. Then, the digital charge reduction loop 200/500 steps up the charge current until the source voltage reaches the safe voltage threshold of about 4.4V. At about t=1.2 ms, the charge current stabilizes at (e.g., oscillates about) about 650 mA. Then, at about t=5 ms (as the digital charge reduction loop 200 recognizes a slight increase in the source voltage due to the decrease in load current from 1 A to about 700 mA), the digital charge reduction loop 200/500 begins to step up the charge current. At about t=5.5 ms (as the source voltage stabilizes at the safe voltage threshold), the charge current stabilizes at about 950 mA. At about t=10 ms (as the digital charge reduction loop 200 recognizes an increase in the source voltage due to the system core 170 drawing no load current), the digital charge reduction loop 200/500 steps up the charge current. At about t=10.5 ms (as the analog control circuit 240 takes over control of the charge current from the digital charge reduction loop 200/500), the charge current flattens again at about 1.25A.

By maximizing the charge current possible, the battery charger 140 fully utilizes power available from the particular input source 245, dramatically reducing charging time. In some embodiments, battery chargers 140 need not be configured to limit maximum charge current to 500 milliamps, and may rely on digital charge reduction to drop charge current to the appropriate level. Also, if a USB device 110 with a USB controller (not shown) is connected to the USB host 105, then the USB controller should recognize that it is plugged into a USB port 130 of a computer system and will distinguish between a type A (500 milliamp) port and a type B (100 milliamp) port. However, if a USB device 110 without a USB controller is connected to a USB host 105, the USB device 110 will be incapable of recognizing that it is plugged into a USB port. (For example, a Bluetooth headset does not have a USB controller, since a Bluetooth headset is not used to exchange data.) Using digital charge reduction, the USB device 110 without a USB controller can be charged by a USB port. With a digital charge reduction loop, the USB device 110 will automatically step-wise reduce current drawn. No external control will be needed.

The foregoing description of the preferred embodiments of the present invention is by way of example only, and other variations and modifications of the above-described embodiments and methods are possible in light of the foregoing teaching. Components may be implemented using a programmed general-purpose digital computer, using application specific integrated circuits, or using a network of interconnected conventional components and circuits. The embodiments described herein are not intended to be exhaustive or limiting. The present invention is limited only by the following claims.

The invention claimed is:

1. A battery charger apparatus for charging a battery, comprising:
    a charge-current control circuit for receiving a charge-current control signal to control an amount of charge current being drawn from an input source;
    an analog control circuit for generating an analog control signal representative of a maximum amount of charge current to be used to charge a battery;
    a digital charge reduction loop including
    a circuit for determining a charge-current adjustment signal based on a source voltage of the input source,
    a counter for generating a digital count value based on the charge-current adjustment signal, and
    a digital-to-analog converter (DAC) for generating a DAC control signal based on the digital count value of the counter, the DAC control signal being representative of a reduced amount of charge current to be used to charge the battery; and
    a switching mechanism for selecting one of the analog control signal or the DAC control signal based on the source voltage, the selected control signal being used as the charge-current control signal to the charge-current control circuit.

2. The battery charger of claim 1, wherein the charge-current control circuit is operative to limit the charge current to the maximum charge current that the battery can handle.

3. The battery charger of claim 1, wherein the circuit for determining the charge-current adjustment signal includes
    a first comparator for comparing a first voltage based on the source voltage against a reference voltage to generate a first comparator output signal, the first comparator output signal being for controlling the counter; and
    a second comparator for comparing a second voltage based on the source voltage against the reference voltage to generate a second comparator output signal, the second comparator output signal being for controlling the switching mechanism.

4. The battery charger of claim 3, wherein the counter is operative to count up when the first comparator output signal is a logical high value.

5. The battery charger of claim 4, wherein the counter is operative to down when the first comparator output signal is a logical low value.

6. The battery charger of claim 3, wherein the switching mechanism is operative to select the DAC control signal as the charge-current control signal and the counter is operative to reset to a predetermined digital value, when the second comparator output signal is a logical low value.

7. The battery charger of claim 1, wherein the switching mechanism is operative to select the analog control signal when the digital count value of the counter is at a predetermined digital value.

8. The battery charger of claim 1, wherein the digital charge reduction loop further comprises a clock oscillator for generating a clock signal, and wherein the counter is operative to modify the digital count value in coordination with the clock signal.

9. The battery charger of claim 1, wherein the circuit for determining the charge-current adjustment signal includes a comparator for comparing a first voltage based on the source voltage against a reference voltage to generate a comparator control signal, the comparator control signal being for controlling the counter and the switching mechanism.

10. The battery charger of claim 9, wherein the counter is operative to count up when the comparator control signal is a logical high value.

11. The battery charger of claim 10, wherein the counter is operative to count down when the comparator control signal is a logical low value.

12. The battery charger of claim 9, wherein the switching mechanism is operative to select the DAC control signal as the charge-current control signal and the counter is operative to reset, when the comparator control signal is a logical low value and the digital counter value is at a predetermined digital value.

13. The battery charger of claim 9, wherein the switching mechanism is operative to select the analog control signal as the charge-current control signal when the digital counter value is at a predetermined digital value.

14. The battery charger of claim 1, wherein the switching mechanism includes
    an RS flip-flop for receiving a reset signal when the source voltage is below a trip threshold voltage, and for receiving a set signal when the digital count value is at a predetermined digital value, the RS flip-flop being operative to generate a RS output signal; and
    a multiplexer for selecting one of the analog control signal or the DAC control signal based on the RS output signal.

15. The battery charger of claim 1, wherein the input source is a USB port.

16. The battery charger of claim 1, wherein the input source is a line adapter.

17. A method of charging a battery, comprising:
    generating a first analog control signal representative of a maximum amount of charge current to be used to charge a battery;
    determining a charge-current adjustment signal based on a source voltage of an input source;
    generating a digital count value based on the charge-current adjustment signal;
    generating a second analog control signal based on the digital count value of the counter, the second analog control signal being representative of a reduced amount of charge current to be used to charge the battery; and selecting based on the source voltage one of the first analog control signal or the second analog control signal to use as a charge-current control signal to a charge-current control circuit.

18. The method of claim 17, further comprising limiting the charge current to the maximum charge current that the battery can handle.

19. The method of claim 17, wherein the determining the charge-current adjustment signal includes
comparing a first voltage based on the source voltage against a reference voltage to generate a first comparator output signal, the first comparator output signal being for controlling the generating the digital count value; and
comparing a second voltage based on the source voltage against the reference voltage to generate a second comparator output signal, the second comparator output signal being for controlling the selecting.

20. The method of claim 19, wherein the generating the digital count value includes increasing the digital count value when the first comparator output signal is a logical high value.

21. The method of claim 20, wherein the generating the digital count value includes decreasing the digital count value when the first comparator output signal is a logical low value.

22. The method of claim 19, wherein, when the second comparator output signal is a logical low value, the selecting includes selecting the DAC control signal as the charge-current control signal and further comprising resetting the digital count value to a predetermined digital value.

23. The method of claim 17, wherein the selecting includes selecting the analog control signal when the digital count value is at a predetermined digital value.

24. The method of claim 17, further comprising generating a clock signal, and wherein the selecting includes modifying the digital count value in coordination with the clock signal.

25. The method of claim 17, wherein determining the charge-current control signal includes comparing a first voltage based on the source voltage against a reference voltage to generate a comparator control signal, the comparator control signal being for controlling the generating the digital count value and the selecting.

26. The method of claim 25, wherein the generating the digital count value includes counting up when the comparator control signal is a logical high value.

27. The method of claim 26, wherein the generating the digital count value includes counting down when the comparator control signal is a logical low value.

28. The method of claim 25, wherein, when the comparator control signal is a logical low value and the digital counter value is at a predetermined digital value, the selecting includes selecting the DAC control signal as the charge-current control signal and further comprising resetting the digital count value.

29. The method of claim 25, wherein the selecting includes selecting the analog control signal as the charge-current control signal when the digital counter value is at a predetermined digital value.

30. The method of claim 17, further comprising
receiving a reset signal when the source voltage is below a trip threshold voltage;
receiving a set signal when the digital count value is at a predetermined digital value; and
generating a RS output signal based on the received signal;
wherein the selecting includes selecting one of the analog control signal or the DAC control signal based on the RS output signal.

31. The method of claim 17, wherein the input source is a USB port.

32. The method of claim 17, wherein the input source is a line adapter.

* * * * *